June 22, 1954 — D. MAPES — 2,681,707
PORTABLE FIRE EXTINGUISHER
Filed June 30, 1951

INVENTOR.
Daniel Mapes
BY
J. William Carson
ATTORNEY

Patented June 22, 1954

2,681,707

UNITED STATES PATENT OFFICE 2,681,707

PORTABLE FIRE EXTINGUISHER

Daniel Mapes, West Caldwell, N. J., assignor to Specialties Development Corporation, Belleville, N. J., a corporation of New Jersey Application June 30, 1951, Serial No. 234,514

3 Claims. (Cl. 169—31)

The present invention relates to portable fire extinguishers of the hand carryable type wherein a charge of fluid fire extinguishing medium such as dry powder or liquid is stored under pressure in a container, and, more particularly, to an improved arrangement for determining whether or not the fluid medium is under sufficient pressure to effect proper discharge thereof.

Fire extinguishers of the foregoing character usually are conditioned for use by placing a charge of the fire extinguishing medium in the container and pressurizing the charge by introducing a sufficient quantity of compressed gas into the container which is adapted to expel the fire extinguishing medium from the container simply upon opening of a valve for controlling the discharge of the medium. After the fire extinguishers have been so conditioned, considerable time may elapse before they are used, and, during this time, the effectiveness of the pressurizing gas may diminish due to unavoidable leakage of the gas from the container. Also, a common practice is to use such extinguishers for putting out a small fire, and, if only a small quantity of the medium has been discharged, to attempt to use the extinguishers for putting out a subsequent fire without reconditioning thereof. Here again, the effectiveness of the pressurizing gas is diminished substantially by the first use of the extinguishers.

In order to determine whether or not fire extinguishers are in condition to function properly, it is customary to inspect the same at regular intervals by ascertaining the weight of the same and deducting the known weight of the extinguisher when empty to approximate the weight of the contents. While such a method of inspection is generally satisfactory to determine the weight of the fire extinguishing medium remaining in the extinguishers, it fails to give any accurate indication as to the weight of the pressurizing gas present because the weight of the gas is very small in relation to the weight of the fire extinguishing medium. Thus, even if the weight of the fire extinguishing medium is known, weighing of the extinguishers is not a practical method of determining whether or not a sufficient quantity of pressurizing gas is in the container to provide for proper discharge of the fire extinguishing medium.

Since the pressure of the gas confined in the extinguishers is in direct proportion to the weight thereof, the present invention contemplates determining whether or not the extinguishers are properly pressurized by providing directly readable indicating means such as a pressure gauge or the like.

Accordingly, an object of the present invention is to provide an improved pressure gauge arrangement for portable fire extinguishers which is simple, compact, practical and reliable.

Another object is to provide such an arrangement wherein the pressure gauge does not protrude from the extinguisher and does not interfere with the handling or operation of the extinguisher.

Another object is to provide such an arrangement wherein the pressure gauge is enclosed to prevent damage thereto but is readily viewed to read the same, and does not invite tampering therewith.

A further object is to provide such an arrangement wherein the pressure gauge is protected against contamination by the fire extinguishing medium.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing portable apparatus of the class described comprising in combination a container adapted for storing a fluid medium under pressure having outlet means, a valve for controlling the discharge of the medium from the container including a valve body secured to the outlet means, a substantially hollow carrying handle secured to the valve body having an opening in a surface thereof, a pressure gauge encased in the handle having a dial positioned to be viewed through the opening, and conduit means having one end in communication with the container outlet means and extending through the valve body and the handle and having its other end in communication with the gauge whereby the gauge is adapted to indicate the pressure to which the medium in the container is subjected.

In a preferred embodiment of the invention about to be described, the handle has a pistol grip portion which is provided with a substantially flat side surface wherein the opening is formed, and the conduit means include an aperture in the valve body in communication with the outlet means of the container and a tube connecting the aperture to the gauge. The valve body aperture is arranged to receive a filter element, the purpose of which will be made apparent hereinafter.

A preferred embodiment of the invention has been chosen for purposes of illustration and description, and is shown in the accompanying drawing, forming a part of the specification, wherein.

Figure 1:
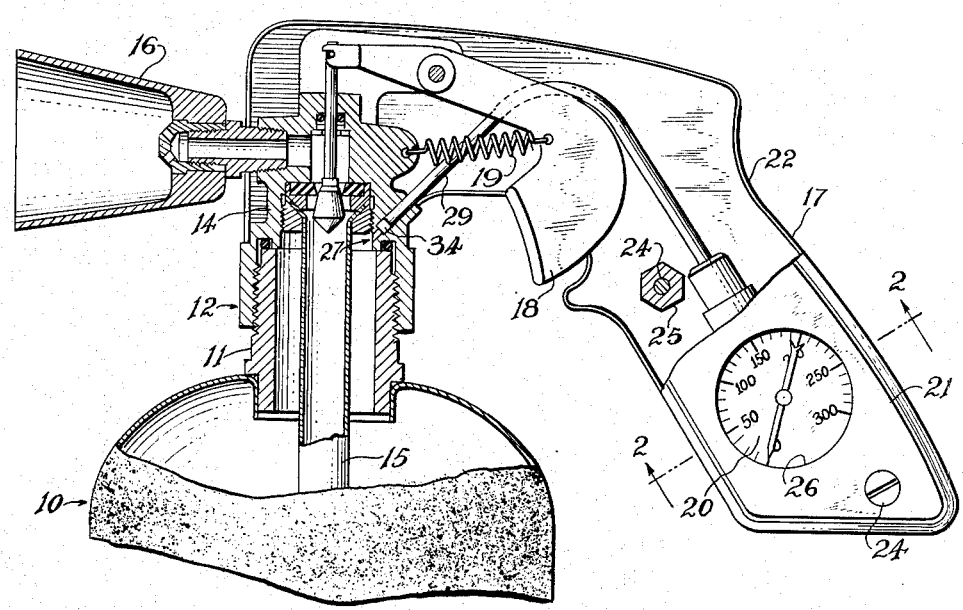
Figure 1 is a view of the upper portion of a portable fire extinguisher or the like, partly in elevation and partly in section, illustrating the pressure gauge arrangement embodying the present invention.

Referring to the drawing in detail and more particularly to Figure 1 thereof, there is shown a fire extinguisher of the hand carryable type which generally comprises a container 10, adapted for storing a fluid fire extinguishing medium such as dry powder or liquid, having a closed end wall at the bottom thereof (not shown) and having outlet means at the upper end thereof including a spud 11; a valve 12 for controlling the discharge of the medium from the container including a valve body or casing 14 secured to the spud; a syphon tube 15 extending from the valve to adjacent the bottom of the container for conducting the fire extinguishing medium to the valve inlet; a discharge horn or shield 16 connected to the valve outlet; a pistol grip type carrying handle 17 secured to the valve body; and valve operating mechanism including a trigger type lever 18 for effecting opening of the valve and a return spring 19 for the lever.

In order to provide for discharge of the fire extinguishing medium when the valve is opened, a pressurizing medium such as nitrogen or other compressed gas is introduced into the container to provide a pressure head of about 200 to 300 pounds per square inch, the magnitude of the pressure head being adapted to be visually determined by observation of a pressure gauge 20.

Figure 2:
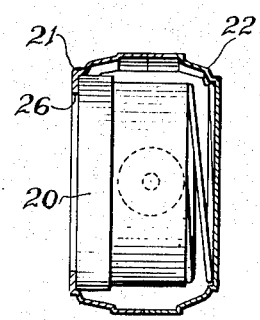
Figure 2 is a sectional view taken along the line 2—2 on Figure 1.

In accordance with the invention, the gauge 20 is encased in the carrying handle 17. This is accomplished by providing a hollow handle preferably constructed of two complementary sections 21 and 22 (Figure 2) formed with substantially flat side surfaces at the gripping portion of the handle to facilitate manual engagement of the handle. The gauge is adapted to be positioned between these side surfaces and retained within the handle when the sections 21 and 22 are secured together, for example, by screws 24 and nuts 25 (Figure 1). The section 21 is formed with a circular opening 26 through which the dial of the gauge may be viewed. As shown herein, the gauge dial crystal mounting ring (Figure 2) abuts the interior of the handle section 21 and the crystal completely closes the opening 26 and is substantially flush with the exterior of the handle section 21, whereby the gauge or the opening will not interfere with the grip afforded by the handle.

Figure 3:
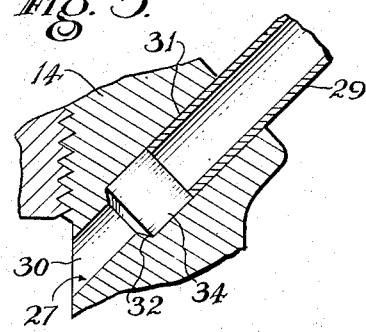
Figure 3 is an enlarged fragmentary sectional view of the filter element and its arrangement in the valve body.

In order to operatively connect the gauge to the interior of the container, the valve body 14 has an aperture 27 extending diagonally downwardly from its exterior, within the handle 17, to its interior in communication with the passageway of the spud, and a tube 29 extending through the interior of the handle connects the outer end of this aperture to the gauge. As shown more particularly in Figure 3, the aperture 27 has a reduced section 30 at its inner end and an enlarged section 31 at its outer end to provide a seat 32 for a filter element 34 adapted to be retained on its seat by the inner end of the tube 29 secured within the aperture section 31.

The filter element 34 preferably is a small cylindrical plug of stainless steel filter sheet having means pore openings on the order of one thousandth of an inch. Such a filter element is effective to permit the pressurizing gas to pass therethrough to operate the gauge, but will prevent powder particles from passing therethrough and contaminate the gauge mechanism. In the event the container is charged with a liquid fire extinguishing mediium, the filter element prevents the flow of liquid into the tube 29.

From the foregoing description, it will be seen that the present invention provides a simple and practical arrangement for indicating the pressure in a fire extinguisher or similar apparatus of the type described. The gauge is encased in the handle to provide a compact structure and does not interfere with the gripping of the handle. The gauge is readily visible but is inaccessible for tampering therewith. The gauge connecting tube is concealed within the handle and likewise cannot be disturbed by tampering.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In portable apparatus of the class described, the combination of a container adapted for storing a fluid medium under pressure having outlet means at the upper end thereof; a valve for controlling the discharge of the medium from the container including a valve body secured to said outlet means and having an aperture permanently in direct fluid flow communication with said outlet means, passageway means extending through said valve body having an inlet and an outlet, a syphon tube extending from said inlet towards the lower end of said container, valve means for controlling said passageway; a lever pivotally mounted on said valve body for operating said valve means having a trigger portion; a substantially hollow carrying handle secured to said valve body and enclosing the upper portion thereof and having a grip section normally grasped in the hand of the operator and provided with a substantially flat side surface portion formed with an opening therein; a pressure gauge completely encased in said handle having a dial and a transparent cover positioned to view said dial through said opening; an elongate tube having one end in communication with said aperture and extending within said handle and completely concealed thereby and having its other end in direct fluid flow communication with said gauge, whereby said gauge is adapted at all times to indicate the pressure to which the medium in said container is subjected; and spring means within said handle extending between said valve body and said lever for normally maintaining said lever in valve closing position; said handle having a slot through which a portion of said lever extends to facilitate manual engagement thereof.

2. In portable apparatus of the class described, the combination of a container adapted for storing dry powder under pressure having outlet means at the upper end thereof; a valve for controlling the discharge of the powder from the container including a valve body secured to said outlet means and having an aperture permanently in direct fluid flow communication with said outlet means, passageway means extending through said valve body having an inlet and an outlet, a syphon tube extending from said inlet, towards the lower end of said container, valve means for controlling said passageway; a lever pivotally mounted on said valve body for operating said valve means having a trigger portion; a substantially hollow carrying handle secured to said valve body and enclosing the upper portion thereof and having a grip portion normally grasped in the hand of the operator and provided with a substantially flat side surface formed with an opening therein; a pressure gauge completely encased in said handle having a dial and a transparent cover positioned to view said dial through said opening; an elongate tube having one end in communication with said aperture and extending within said handle and completely concealed thereby and having its other end in direct fluid flow communication with said gauge, whereby said gauge is adapted at all times to indicate the pressure to which said dry powder in said container is subjected; spring means within said handle extending between said valve body and said lever for normally maintaining said lever in valve closing position; said handle having a slot through which a portion of said lever extends to facilitate manual engagement thereof; and a filter element in said aperture adjacent said first mentioned end of said tube.

3. An apparatus according to claim 2, wherein said aperture is formed with a seat and said filter element is retained on said seat by said first mentioned end of said tube and said tube is secured in said aperture.

References Cited in the file of this patent

UNITED STATES PATENTS

| Number | Name | Date |
|--------|------|------|
| 685,304 | Sigafoos | Oct. 29, 1901 |
| 1,289,360 | Bargar | Dec. 31, 1918 |
| 1,675,232 | Straubhaar | June 26, 1928 |
| 2,548,750 | Stroop | Apr. 10, 1951 |